United States Patent [19]

Sibbald

[11] Patent Number: 5,619,586
[45] Date of Patent: Apr. 8, 1997

[54] METHOD AND APPARATUS FOR PRODUCING A DIRECTLY VIEWABLE IMAGE OF A FINGERPRINT

[75] Inventor: Alastair Sibbald, Maidenhead, United Kingdom

[73] Assignee: Thorn EMI plc, London, United Kingdom

[21] Appl. No.: 433,303

[22] Filed: May 3, 1995

Related U.S. Application Data

[63] Continuation of Ser. No. 39,202, filed as PCT/GB91/02295, Dec. 20, 1991, published as WO92/11608, Jul. 9, 1992, abandoned.

[30] Foreign Application Priority Data

Dec. 20, 1990 [GB] United Kingdom ............... 9027718

[51] Int. Cl.⁶ ........................................... G06K 9/00
[52] U.S. Cl. ............................... 382/127; 356/71
[58] Field of Search .................. 356/71; 382/124, 382/127; 250/458.1; 359/831, 837

[56] References Cited

U.S. PATENT DOCUMENTS

| | | | |
|---|---|---|---|
| 4,340,300 | 7/1988 | Ruell | 356/71 |
| 4,703,182 | 10/1987 | Kroneis et al. | 250/458.1 |
| 4,728,186 | 3/1988 | Eguchi et al. | 356/71 |
| 5,077,803 | 12/1991 | Kato et al. | 382/124 |
| 5,088,817 | 2/1992 | Igaki et al. | 356/71 |
| 5,099,131 | 3/1992 | Brownrigg et al. | 250/458.1 |
| 5,177,802 | 1/1993 | Fujmoto et al. | 382/124 |

FOREIGN PATENT DOCUMENTS

| | | | |
|---|---|---|---|
| 0308162 | 3/1989 | European Pat. Off. | A61B 5/10 |
| 0359554 | 3/1990 | European Pat. Off. | G06K 9/20 |
| 0459712 | 12/1991 | European Pat. Off. | G06K 9/74 |
| 2846190 | 5/1979 | Germany | A61B 5/10 |

*Primary Examiner*—Andrew Johns
*Attorney, Agent, or Firm*—Keck, Mahin & Cate

[57] ABSTRACT

A directly viewable fingerprint image is formed by illuminating a transparent planar substrate from one surface with collimated light, the substrate having pressed against the other surface a fingerprint to be imaged. Light striking the surface against which ridges of the fingerprint are in contact undergoes internal reflection within the substrate and causes a directly viewable image of the fingerprint to be formed by a direct image producing means.

10 Claims, 5 Drawing Sheets

METHOD AND APPARATUS FOR PRODUCING A DIRECTLY VIEWABLE IMAGE OF A FINGERPRINT

This is a continuation application of Ser. No. 08/039,202, filed as PCT/GB91/02295 Dec. 20, 1991 published as WO92/11608 Jul. 9, 1992, now abandoned.

The present invention relates to apparatus and a method for fingerprint imaging.

Methods and apparatus for fingerprint characterisation are well known and generally require an image of a fingerprint to be formed, either electronically or physically, this formed image being the basis of the characterisation technique. In order for the characterisation to be effective and as accurate as possible it is a requirement that the image of the fingerprint so formed be as sharp as possible and that there be high contrast as between the ridges and recesses present in the actual fingerprint. The Applicant's present UK Patent Application number 9006370.2 discloses a fingerprint characterisation technique which relies on such an image.

Various methods have been proposed for forming such high-contrast, good definition images. One example is European Patent Application, publication number 0,348,182. This discloses a system having a transparent base with upper and lower surfaces. The upper surface defines a contact portion against which is placed the fingerprint to be imaged. Light is incident, via the transparent base, upon this portion. Some of the light strikes those areas of the contact portion, above which are recesses in the fingerprint, and is then reflected back toward the lower surface and out of the base. Some light, however, strikes other areas of the contact portion above and in contact with which is a ridge of fingerprint. The light striking these other areas is diffusely reflected or scattered and some of this will undergo total internal reflection within the base. This totally internally reflected light is then drawn out of the transparent base via a lens and enters an image sensor.

A similar method is employed by European Patent Application, publication number 0,194,783. Once again, the light which is used to form the image is that which is diffusely scattered or reflected from the portion of the transparent plate which is in contact with the fingerprint ridges and then undergoes total internal reflection within the transparent plate. This system also requires some form of optical element, for example, a hologram, to guide this light out of the transparent plate and on to an image detector.

Such systems suffer from having to rely on the diffusely scattered or reflected light from the finger ridges to contrast with the absence of such where the inter-ridge gaps exist in order to form the final image. However, it is possible for light to be scattered into the inter-ridge areas, and then back into the transport plate, thus creating the same effect as the presence of a ridge (scattering and reflection) where no ridge is present. As a consequence, images so obtained tend to suffer poor contrast and appear as pink on grey rather than black on white for a good contrast image.

In addition, any residues of skin or grease remaining upon the contact portion of the transparent plate tend to scatter sufficient incident light so as to produce latent images which carry over to subsequent images and degrade their quality.

Furthermore, such systems do not produce a direct image of the fingerprint. They require further optical equipment to intercept the totally internally reflected light and to utilise this light in order to produce a viewable image.

It is thus an object of the present invention to provide a method of producing an image of a fingerprint wherein the image is a direct image, that is, the image may be viewed without the aid of optical equipment, and wherein the image so produced is of substantially increased contrast as compared to the prior art devices, making the image particularly suitable for use in the Applicant's aforementioned co-pending application, No. 9006370.2.

It is a further object of the present invention to provide apparatus for producing such an image.

Hence, according to a first aspect of the present invention there is provided a method for forming a directly viewable image of a fingerprint, the method comprising; introducing collimated light into a light transmitting member having first and second parallel major surfaces such that the light interacts with the first major surface thereof, in contact with which is a fingerprint to be imaged, the light then reflecting from the first major surface towards the second major surface, optically coupled with which is a directly viewable image producing means, thereby to form a directly viewable image of the fingerprint. Thus the need for a detector or other optical equipment receptive to diffusely scattered or reflected light thereby to produce an image is obviated because a directly viewable image is produced. Because both the fingerprint and image thereof lie in parallel planes by virtue of the parallel major surfaces of the light transmitting means, there is no requirement for compensation of 'kerbstone' distortion and no need for a large depth-of-field in the image detector means as is the case with prior-art non-direct image formation methods. The term 'kerbstone' distortion (which is introduced by obliquely viewing an object) will be assumed to be understood by persons skilled in this art.

According to a second aspect of the present invention there is provided apparatus for forming a direct image of a fingerprint comprising a light transmitting member having a first major surface for receiving a fingerprint and a second major surface, arranged substantially parallel to the first major surface and in optical cooperation with a direct image producing means, the apparatus arranged for receiving collimated light via the second major surface and reflecting from the first major surface thereby to produce a direct image of a fingerprint.

Preferably the direct image producing means comprises a light scattering surface such as a ground glass plate member or the like or a very thin layer of paint which is non-opaque, or the like. So long as the direct image producing means is optically-coupled with the light transmitting member, that is, their respective refractive indices match, or they are coupled together using known refractive index matching means, such as a suitable gel, oil or adhesive, then the image producing means is receptive to light impinging thereon and acts as a back-projection viewing screen or "secondary" light source.

Alternatively or additionally the direct image producing means comprises fluorescent material. This may take the form of a dye-doped plastics material.

Preferably the coilimated light is introduced into the light transmitting member via a prism means. Advantageously light is reflected from the first major surface toward the second major surface by total internal reflection.

The invention will now be described, by way of example only, with reference to the following drawings of which;

Figure 1:
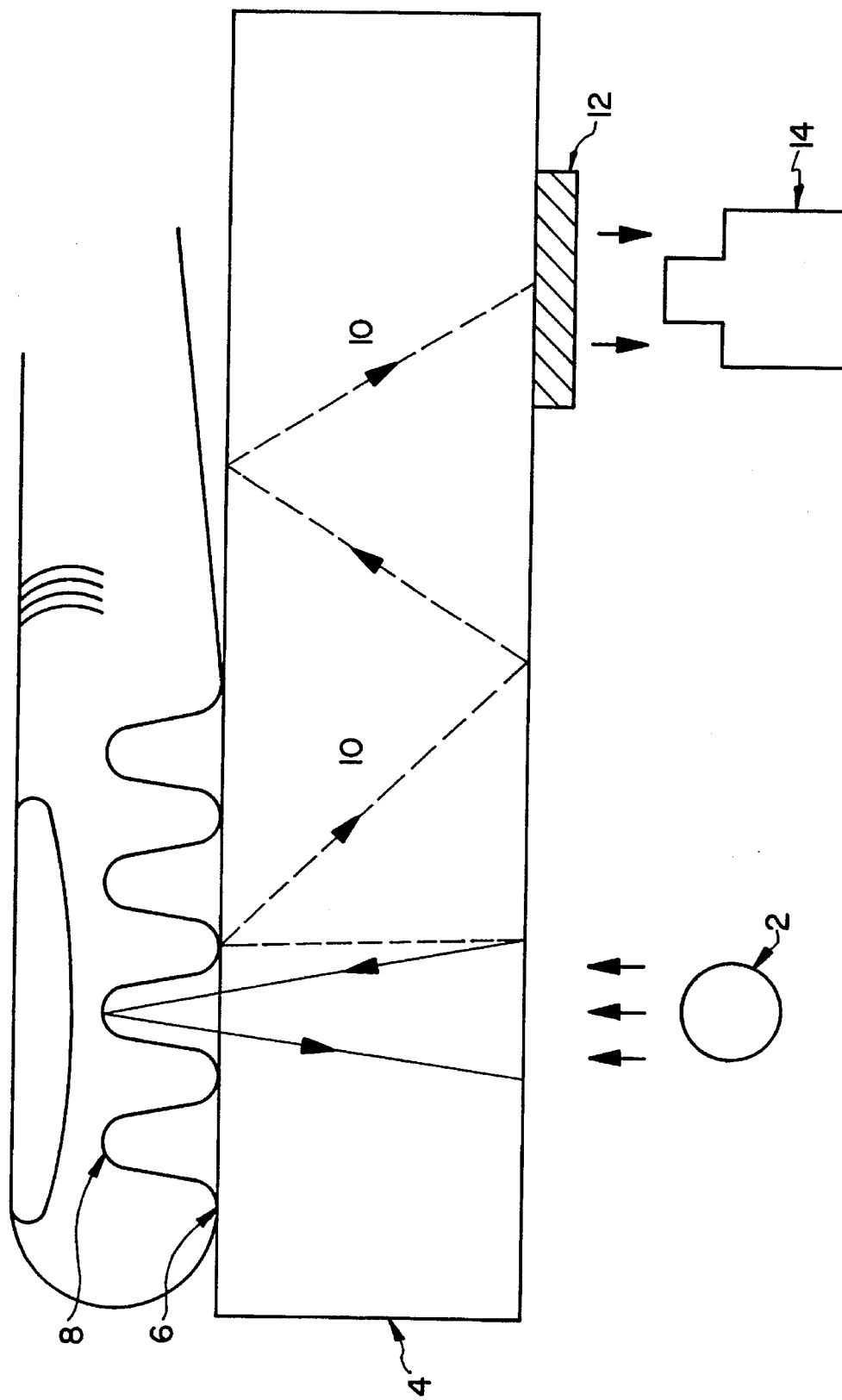
FIG. 1 shows a schematic representation of a prior art fingerprint imaging device.

Referring firstly to FIG. 1 a light source 2 is effective to illuminate a transparent plate 4. In contact with the plate 4 is a fingerprint characterised by ridges 6 and recesses 8, the ridges 6 being in contact with the surface of plate 4 and the recesses 8 being spaced from the surface of plate 4 by a series of air gaps. Light entering the plate 4 is randomly reflected by the ridges 6 and is thereby scattered in all directions, since an air gap is not formed at ridges 6. Scattered light beams 10 which satisfy the total internal reflection condition, that is, have an angle of incidence greater than the critical angle, are totally reflected by the lower surface of plate 4. Such beams, only one of which is shown in FIG. 1, are then totally reflected by the lower surface of plate 4 and then, following one or more further total internal reflections at upper and lower surfaces, pass through some form of optical element 12, for example a hologram or lens, to be detected by an image sensor 14 arranged outside of the transparent plate 4. This is necessary because the system does not form a direct image of the fingerprint.

Alternatively light from light source 2 may be arranged to strike the upper internal surface of plate 4 at an angle of incidence greater than the critical angle; in which case light striking the surface in areas above which is a recess 8 will be totally reflected, whilst light striking the surface in areas at which is a ridge 6 will be partially absorbed due to a change in the critical angle as a result of a modified index of refraction due to the contact of the ridge 6 with the plate 4 surface.

Figure 2:
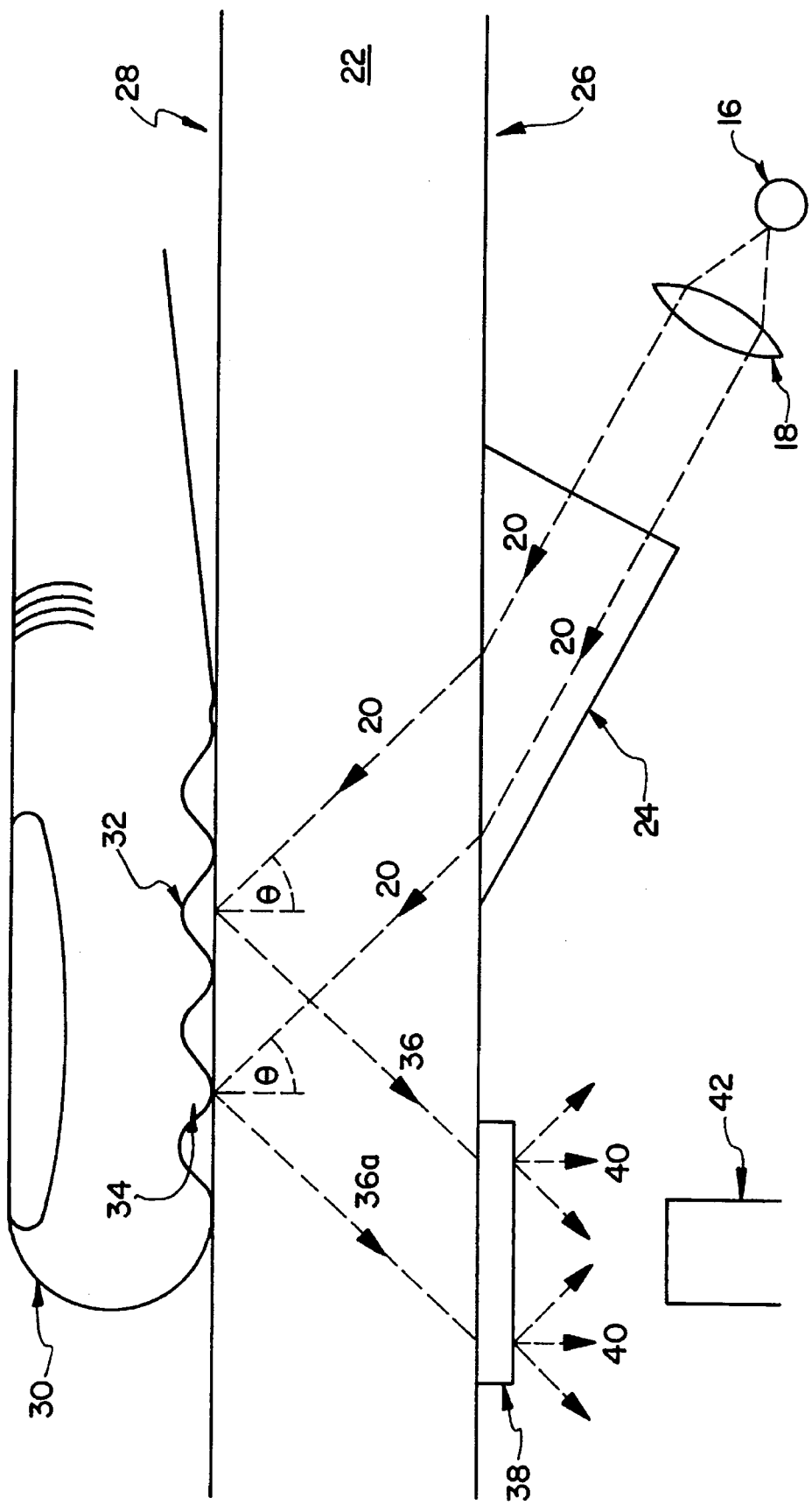
FIG. 2 shows a schematic representation of a first embodiment of the present invention.

FIG. 2 illustrates one embodiment of the present invention wherein relatively poor contrast images, as are obtained by such devices as shown in FIG. 1, are at least alleviated.

The embodiment in FIG. 2 comprises a light source 16 and collimating lens 18 arranged to produce a broad collimated light beam 20. This light 20 is introduced into a light transmitting member 22, which is in the form of a transparent substrate such as a glass or plastics plate, via a prism means 24 such as a glass prism optically coupled to one major surface 26 of the light transmitting member 22 by a refractive index coupling medium. Alternatively, the prism 24 can be formed integrally with the light transmitting member 22.

A second major surface 28 of the light transmitting member is arranged parallel to major surface 26. Against the second major surface 28 is held a finger 30 from which a fingerprint image is to be obtained. It is to be understood that the expression "fingerprint" is to include all anatomical attributes characteristic of an individual which are susceptible to the present method such as thumb-prints, palm-prints and foot-prints. The finger is chosen simply as it is the most convenient by way of example.

The angle of incidence, q, at which the collimated light 20 strikes the upper surface 28 against which is placed the finger 30 is arranged to be greater than the critical angle for the medium from which the light transmitting member 22 is formed, such as by appropriately positioning the light source 16 relative to that area of the major surface 28 designated to receive the finger.

This means that light 20 striking a point on the surface 28 above which is a recess 32 of the fingerprint will be totally internally reflected, as shown schematically by reflected light ray 36, towards lower surface 26. Light 20 striking surface 28 in those areas in contact with which is a fingerprint ridge 34 will be largely absorbed, scattered and diffusely reflected, as shown schematically by reflected light ray 36a, towards lower surface 26 but with reduced intensity as a result of such processes.

A direct image producing means 38, in the form of a transparent fluorescent plastics layer material, is in optical cooperation with the lower surface 26 of member 22. The direct image producing means 38 need not be in direct contact with surface 26, in which case some form of refractive index coupling medium may be required.

Reflected light 36 passes through the light transmitting member 22 via lower surface 26 and impinges upon the direct image producing means 38. The reflected light 36 is apatially modified as compared with the incident light 20 due to the spatially dependent absorption processes which occur where the light is internally reflected at the upper surface 28 caused by the pressure of ridges 34.

The fluorescent dye within the direct image producing means 38 absorbs the reflected light 36 incident thereon within a specific wavelength range (governed by the fluorescent dye) and then re-emits light 40 in a characteristic (of the dye) narrow, longer-wavelength range, as determined by the fluorescent dye. The spatial modulation at this stage is unaffected, that is, the image of the light is unchanged as between that of the fingerprint on upper surface 28 and that produced by the direct image producing means 38.

Fluorescence of the dye in the direct image producing means 38 may be enabled not only by the wavelength characteristics of the incident light, but also by the intensity of this light. It will be apparent that those components of reflected light 36 which have undergone total internal reflection at upper surface 28 are of greater intensity than those components of reflected light 36a which have been largely absorbed, scattered and diffusely reflected from upper surface 28. Hence, by suitable choice of initial light 16 intensity, and transmission coefficients of the direct image producing means 38, it is possible to arrange for the absorbed, scattered and diffusely reflected light 36a to be of insufficient significant intensity to cause fluorescent within the direct image producing means 38.

Thus the image produced will have light areas (caused by fluorescence) corresponding to those points on the upper surface 28 underlying fingerprint recesses 32; and dark areas (caused by non-fluorescence) corresponding to those points on the upper surface 28 in contact with fingerprint ridges 34. It will be appreciated that there will be high contrast between these light and dark areas as compared with prior art devices. Because the lower surface 26 and upper surface 28 of the light transmitting member 22 are parallel, then it will be seen that if the direct image producing means 38 is planar, then the plane of emission of light 40 egressing from the direct image producing means 38 is parallel to the object plane; that is, the upper surface 28. This means that there will be no spatial distortion between the fingerprint and its fluorescent image, thus obviating 'kerbstone' and associated unwanted image distortion effects which would require anamorphic correction or compensation.

Furthermore, because the fluorescence of the image producing means 38 acts in effect as a back projection viewing screen or 'secondary' light source, then the image so produced is a direct image, which means it may by viewed by eye or a video camera 42 or the like. There is no optical processing required to view the image produced in this way. The size ratio of image to subject in the present invention is intrinsically 1:1.

Figure 3:
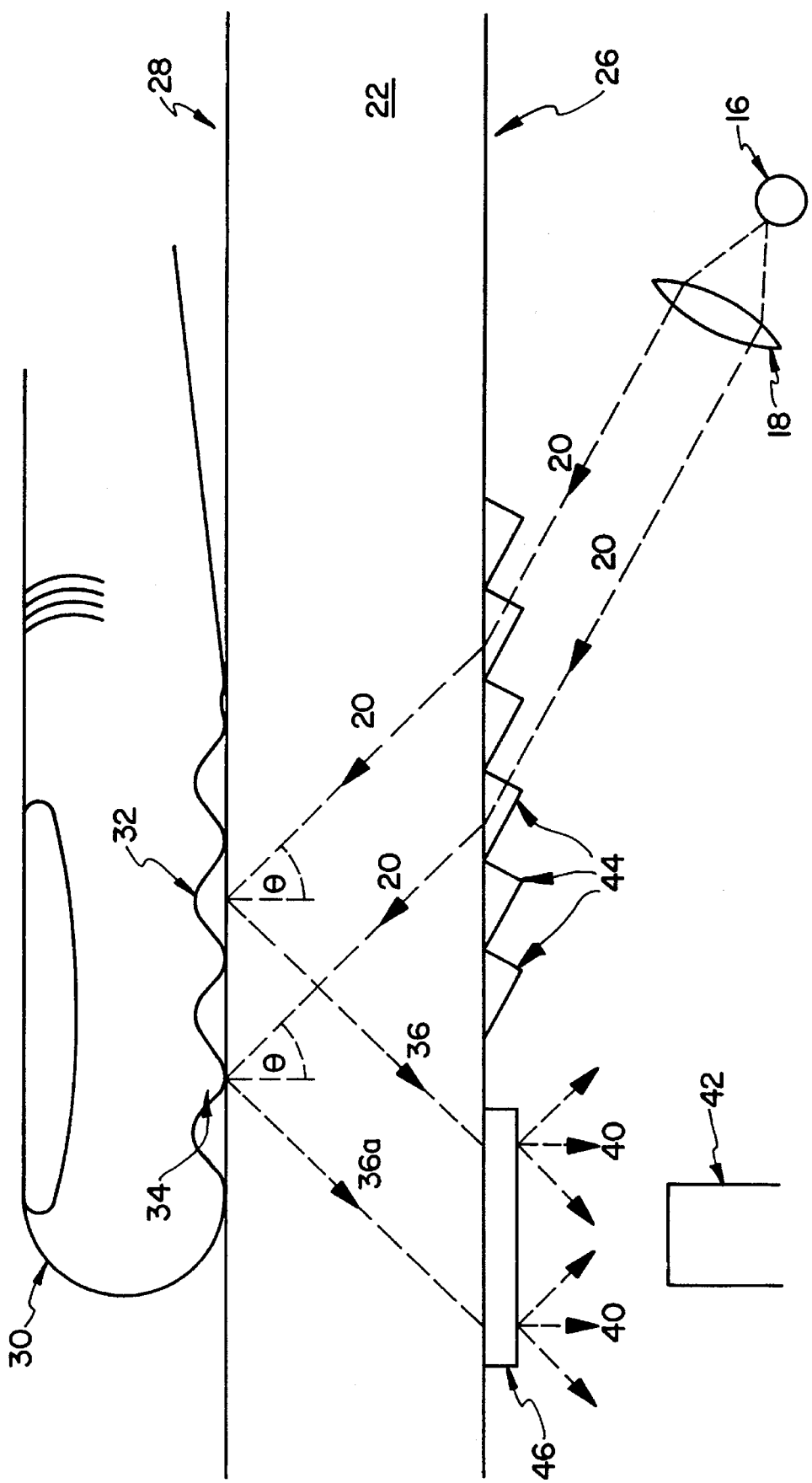
FIG. 3 shows a schematic representation of a further embodiment of the present invention.

Referring now to FIG. 3, wherein similar components to that of FIG. 2 are like numbered, an alternative embodiment of the present invention is illustrated.

In this alternative embodiment, the collimated light 20 is introduced into the light transmitting member by way of a prism means in the form of a Fresnel prism strip 44. This allows for a more compact device than the previous described embodiment employing a prism 24.

Also, FIG. 3 details the image producing means being in the form of a ground glass plate 46 or thin layer of non-opaque paint applied to the surface 26. Whilst this form of image producing means does not work by fluorescence, the ground glass plate 46 scatters or diffuses the reflected light 36 incident thereon and hence also produces a direct image of the fingerprint.

Figure 5:
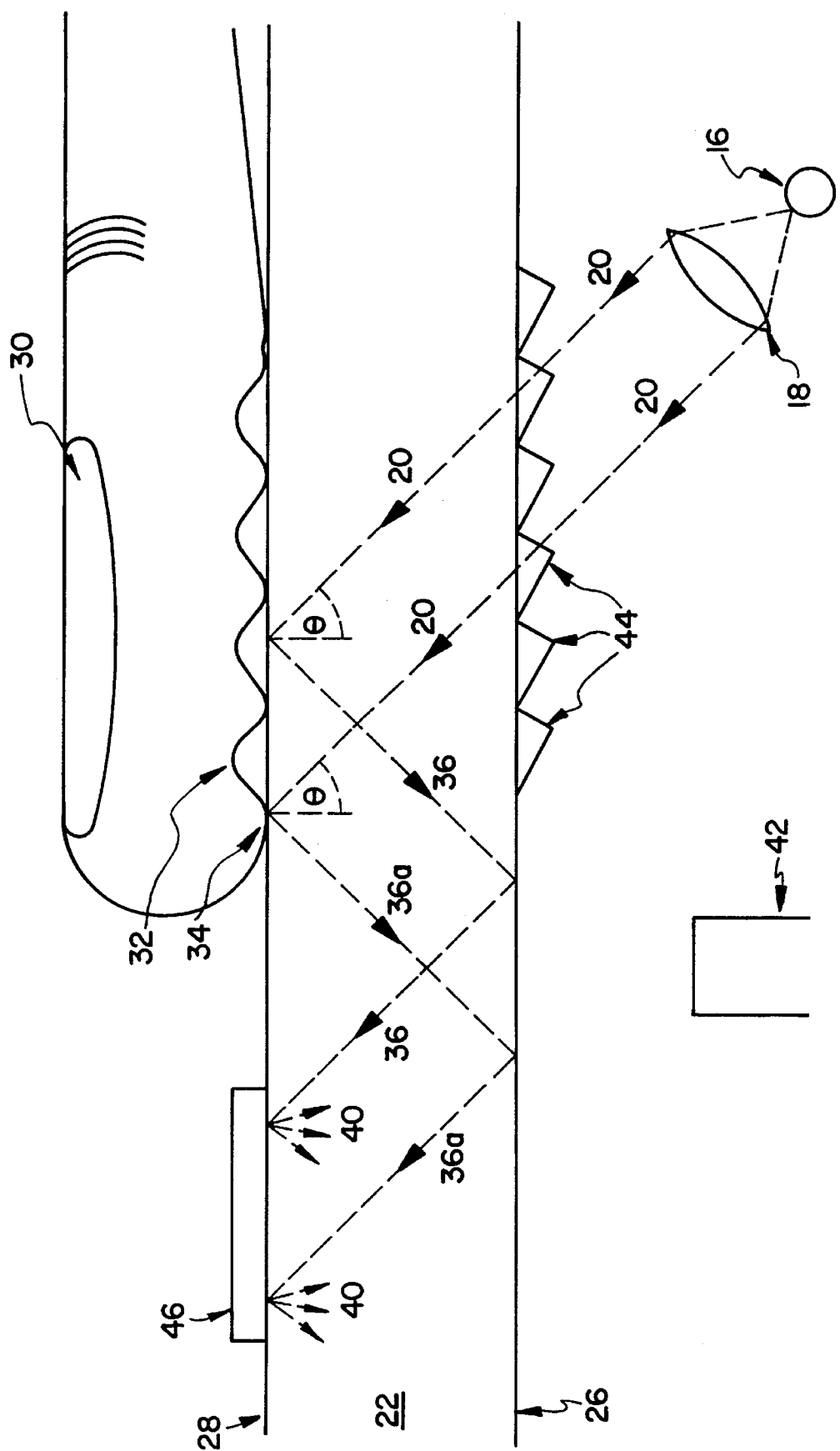
FIG. 5 shows a schematic illustration of yet a further embodiment of the present invention.

FIG. 5 illustrates a further embodiment of the present invention in which the spatially modulated light 36, 36a is permitted to undergo a further total internal reflection at surface 26 before being imaged onto the ground glass plate 46. In this case, the direct image produced is viewed by video camera 42 from lower surface 26 via the light transmitting member 22. This particular embodiment allows for the finger-placement surface to be laterally displaced from the imaging screen thereby providing for a compact imaging system.

It will be appreciated by those skilled in this art that the present invention provides a compact, relatively slim imaging system by suitable choice of the optical components described herebefore.

Figure 4:
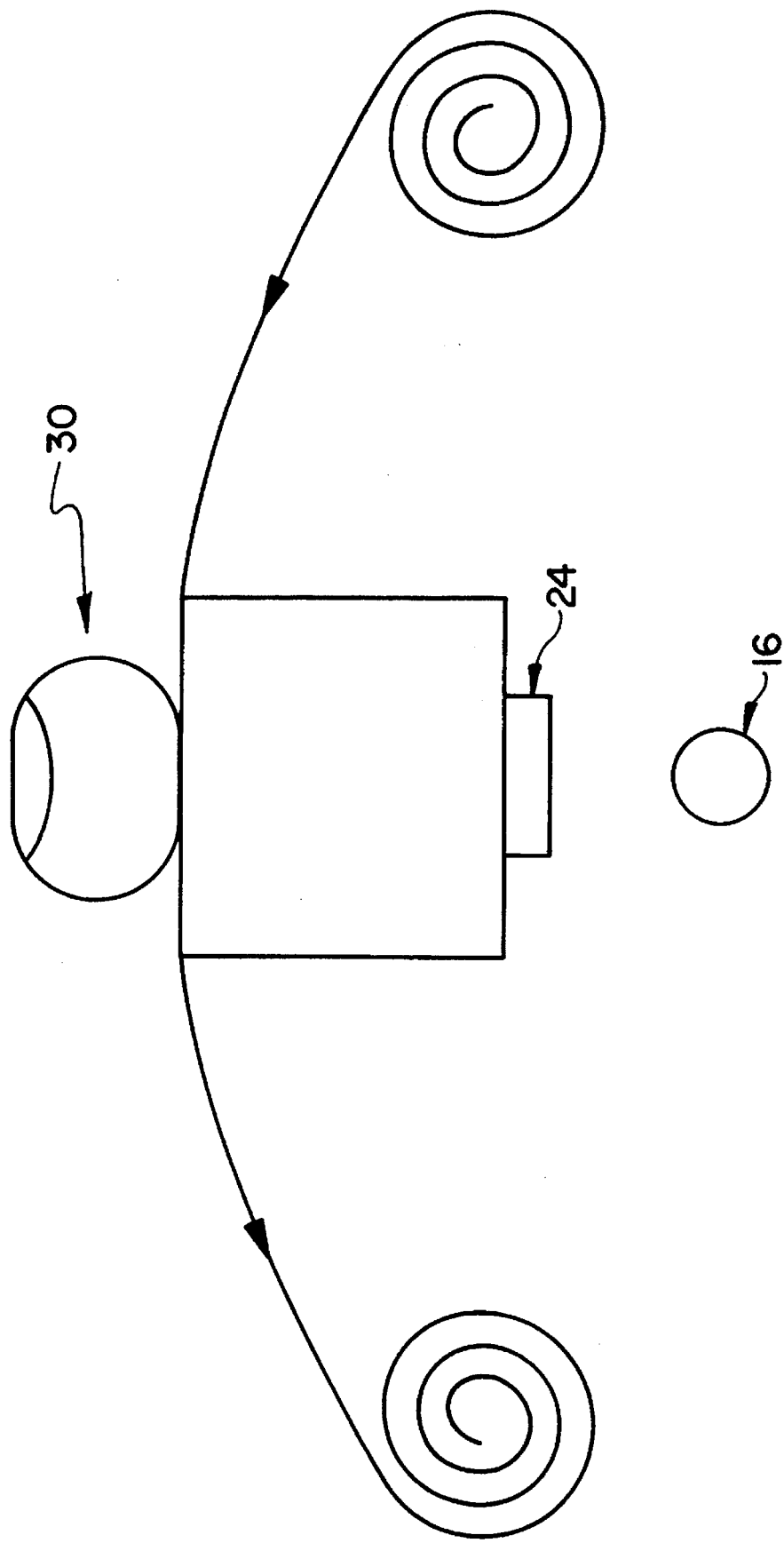
FIG. 4 shows a schematic illustration of yet a further embodiment of the present invention.

Furthermore, it will be appreciated that the possibility exists of providing low-cost replaceable light transmitting members which may be discarded after a certain amount of use due to the build-up of grease or other deposits on the upper surface thereof. Such grease (and dirt) is inherent within any skin. Also it is possible to overlie the upper surface of the light transmitting member with a 'scroll' of transparent material or the like such that a fresh surface may be presented to each fingerprint, as shown in FIG. 4.

It will be apparent to those skilled in the art that by producing a direct image, the image plane, that is the fluorescent plastics layer or ground glass or the like is accessible. Hence, any optical calibration which may be required, for example alignment of video camera 42 may be achieved by simply inserting some form of reference grid or "test card" over the direct image plane.

It will also be appreciated that the present invention requires no focussing or correction elements or the like due to the formation of a direct image. Furthermore, because the invention is relatively simple optically, alignment procedures and assembly costs are not extensive.

I claim:

1. A method for forming a direct image of a fingerprint, the method comprising:

introducing collimated light into a light transmitting member having first and second parallel major surfaces such that the light interacts with the first major surface thereof, in contact with which is a fingerprint to be imaged, the light then reflecting from the first major surface towards the second major surface, characterized in that one of said major surfaces carries a directly viewable image producing means which receives light reflected from the first major surface and emits scattered light in response thereto to form a directly viewable image of the fingerprint at the said image producing means.

2. A method according to claim 1, wherein the collimated light is introduced into the light transmitting member such that the light interacts with the first major surface at an angle greater than the critical angle for the light transmitting member.

3. A method according to claim 1, wherein the directly viewable image producing means includes fluorescent material thereby to form the directly viewable image by fluorescence.

4. An apparatus for forming a direct image of a fingerprint comprising a light transmitting member having a first major surface for receiving a finger print and a second major surface arranged substantially parallel to the first major surface, a light source for introducing collimated light into the light transmitting member via the second major surface to interact with the first major surface and reflect therefrom, and a directly viewable image producing means being carried by a said major surface for receiving light which has been so reflected and emitting scattered light in response thereto to produce a directly viewable image of a fingerprint at the said image producing means.

5. An apparatus according to claim 4, wherein the directly viewable image producing means comprises a light scattering surface.

6. An apparatus according to claim 4, wherein the directly viewable image producing means comprises fluorescent material.

7. An apparatus according to claim 5, wherein the directly viewable image producing means further comprises fluorescent material.

8. An apparatus according to claim 4, wherein the collimated light is introduced into the light transmitting member via a prism in optical contact with the second major surface.

9. An apparatus according to claim 4, wherein the light transmitting member comprises a transparent planar member.

10. An apparatus according to claim 4, wherein the reflection is total internal reflection within the light transmitting member.

* * * * *